United States Patent
Erickson et al.

(10) Patent No.: US 10,882,243 B2
(45) Date of Patent: Jan. 5, 2021

(54) ADJUSTABLE HEIGHT MEMBRANE FOR HOT DRAPE FORMING A PART

(71) Applicant: The Boeing Company, Chicago, IL (US)

(72) Inventors: Jordan S. Erickson, Federal Way, WA (US); P. Chace Wilcoxson, Kent, WA (US)

(73) Assignee: The Boeing Company, Chicago, IL (US)

( * ) Notice: Subject to any disclaimer, the term of this patent is extended or adjusted under 35 U.S.C. 154(b) by 375 days.

(21) Appl. No.: 15/581,420

(22) Filed: Apr. 28, 2017

(65) Prior Publication Data

US 2018/0311887 A1 Nov. 1, 2018

(51) Int. Cl.
| | | |
|---|---|---|
| B29C 51/28 | (2006.01) | |
| B29C 51/10 | (2006.01) | |
| B29C 51/18 | (2006.01) | |
| B29C 53/04 | (2006.01) | |
| B29C 53/84 | (2006.01) | |
| B29C 53/02 | (2006.01) | |
| B29C 51/14 | (2006.01) | |

(52) U.S. Cl.
CPC .............. *B29C 51/28* (2013.01); *B29C 51/10* (2013.01); *B29C 51/18* (2013.01); *B29C 53/025* (2013.01); *B29C 53/04* (2013.01); *B29C 53/84* (2013.01); *B29C 51/14* (2013.01); *B29C 51/145* (2013.01); *B29C 2791/006* (2013.01)

(58) Field of Classification Search
CPC ................................ B29C 51/28; B29C 51/10
USPC ....................................................... 264/549
See application file for complete search history.

(56) References Cited

U.S. PATENT DOCUMENTS

| | | | | |
|---|---|---|---|---|
| 4,447,282 A | * | 5/1984 | Valerio | B27D 1/08 |
| | | | | 156/212 |
| 4,475,976 A | | 10/1984 | Mittelstadt et al. | |
| 5,225,027 A | * | 7/1993 | Diekwisch | B29C 51/16 |
| | | | | 156/285 |
| 5,580,415 A | * | 12/1996 | Diekwisch | B23Q 1/03 |
| | | | | 100/211 |
| 5,648,109 A | | 7/1997 | Gutowski et al. | |
| 6,814,916 B2 | | 11/2004 | Willden et al. | |
| 7,118,370 B2 | | 10/2006 | Willden et al. | |

(Continued)

FOREIGN PATENT DOCUMENTS

WO WO-2014034576 A1 * 3/2014 ............. B29C 43/10

*Primary Examiner* — Peter L Vajda
*Assistant Examiner* — Russell E Sparks
(74) *Attorney, Agent, or Firm* — Kunzler Bean & Adamson

(57) ABSTRACT

Disclosed herein is an apparatus for adjusting membrane height for hot drape forming. The apparatus includes a frame including an enclosable interior space and sidewalls defining a perimeter of the interior space. The apparatus further includes an adjustable collar within the interior space of the frame. The adjustable collar extends about the perimeter of the interior space and is configured to move translationally within the interior space of the frame along the sidewalls in a first direction. The apparatus further includes a membrane extending across the interior space in a second direction, perpendicular to the first direction, and co-movably coupled with the adjustable collar, wherein a position of the membrane within the interior space is adjustable in the first direction as the adjustable collar moves translationally within the interior space.

20 Claims, 6 Drawing Sheets

(56) References Cited

U.S. PATENT DOCUMENTS

| | | | |
|---|---|---|---|
| 10,343,312 B2* | 7/2019 | Kawaguchi | B29C 43/10 |
| 2007/0000826 A1* | 1/2007 | Stevens | B30B 5/02 |
| | | | 210/153 |
| 2011/0205485 A1* | 8/2011 | Sonzogni | B29D 12/00 |
| | | | 351/124 |
| 2018/0162020 A1* | 6/2018 | Cho | B29C 43/184 |

* cited by examiner

ADJUSTABLE HEIGHT MEMBRANE FOR HOT DRAPE FORMING A PART

FIELD

This disclosure relates generally to hot drape forming processes, and more particularly to an adjustable height membrane for use in a hot drape forming process.

BACKGROUND

Making parts by hot drape forming (HDF) allows for composite materials to be formed into curved or contoured shapes based on a contoured tool or forming tool. Current HDF configurations either have the membrane non-adjustably attached to the bottom or top of a fixed frame, which makes forming parts of various sizes and shapes difficult.

SUMMARY

The subject matter of the present application has been developed in response to the present state of the art, and in particular, in response to the problems and disadvantages associated with conventional hot drape forming processes that have not yet been fully solved by currently available techniques. Accordingly, the subject matter of the present application has been developed to provide embodiments of a system, an apparatus, and a method that overcome at least some of the above-discussed shortcomings of prior art techniques. For example, according to one implementation, an adjustable height membrane for hot drape forming is disclosed, which facilitates the use of varying height forming tools and the manufacture of variously-sized parts using a single frame.

Disclosed herein is an apparatus for adjusting a membrane height for a hot drape forming process according to one or more examples of the present disclosure. The apparatus includes a frame including an enclosable interior space and sidewalls defining a perimeter of the interior space. The apparatus further includes an adjustable collar within the interior space of the frame. The adjustable collar extends about the perimeter of the interior space and is configured to move translationally within the interior space of the frame along the sidewalls in a first direction. The apparatus further includes a membrane extending across the interior space in a second direction, perpendicular to the first direction, and co-movably coupled with the adjustable collar, wherein a position of the membrane within the interior space is adjustable in the first direction as the adjustable collar moves translationally within the interior space. The preceding subject matter of this paragraph characterizes example 1 of the present disclosure.

The membrane is non-releasably attached to the adjustable collar. The preceding subject matter of this paragraph characterizes example 2 of the present disclosure, wherein example 2 also includes the subject matter according to example 1, above.

A tension in the membrane is constant at any of various positions in the first direction. The preceding subject matter of this paragraph characterizes example 3 of the present disclosure, wherein example 3 also includes the subject matter according to any one of examples 1-3, above.

The frame comprises a base and a hood. The preceding subject matter of this paragraph characterizes example 4 of the present disclosure, wherein example 4 also includes the subject matter according to any one of examples 1-3, above.

The apparatus may further include an anchor external to the frame. The membrane is attached to the anchor. The preceding subject matter of this paragraph characterizes example 5 of the present disclosure, wherein example 5 also includes the subject matter according to any one of examples 1-4, above.

The membrane extends out of the frame between the base and the hood. The preceding subject matter of this paragraph characterizes example 6 of the present disclosure, wherein example 6 also includes the subject matter according to any one of examples 4-5, above.

The anchor external to the frame is movably fixed to the frame. The preceding subject matter of this paragraph characterizes example 7 of the present disclosure, wherein example 7 also includes the subject matter according to example 6, above.

The adjustable collar and the anchor are configured to move synchronously. The preceding subject matter of this paragraph characterizes example 8 of the present disclosure, wherein example 8 also includes the subject matter according to any one of examples 6-7, above.

The membrane is releasably attached to the adjustable collar. The preceding subject matter of this paragraph characterizes example 9 of the present disclosure, wherein example 9 also includes the subject matter according to any one of examples 1 and 4-6, above.

The membrane stretches around the adjustable collar. The preceding subject matter of this paragraph characterizes example 10 of the present disclosure, wherein example 10 also includes the subject matter according to example 9, above.

The membrane is an elastomeric membrane. The preceding subject matter of this paragraph characterizes example 11 of the present disclosure, wherein example 11 also includes the subject matter according to any one of examples 1-10, above.

A position of the adjustable collar along the first direction is controlled electronically. The preceding subject matter of this paragraph characterizes example 12 of the present disclosure, wherein example 12 also includes the subject matter according to any one of examples 1-11, above.

Disclosed herein is a system for adjusting a membrane height for a hot drape forming process according to one or more examples of the present disclosure. The system includes a forming tool, a laminate material, a heat source, and an apparatus. The apparatus includes a frame including an enclosable interior space and sidewalls defining a perimeter of the interior space. The forming tool and the laminate material are positioned within the interior space. The apparatus further includes an adjustable collar within the interior space of the frame. The adjustable collar extends about the perimeter of the interior space and is configured to move translationally within the interior space of the frame along the sidewalls in a first direction. The apparatus further includes a membrane extending across the interior space in a second direction, perpendicular to the first direction, and co-movably coupled with the adjustable collar, wherein a position of the membrane within the interior space is adjustable in the first direction as the adjustable collar moves translationally within the interior space. The preceding subject matter of this paragraph characterizes example 13 of the present disclosure.

The membrane extends across the interior space in the second direction at a position directly above the laminate material. The preceding subject matter of this paragraph characterizes example 14 of the present disclosure, wherein example 14 also includes the subject matter according to example 13, above.

The forming tool includes a predetermined height. The preceding subject matter of this paragraph characterizes example 15 of the present disclosure, wherein example 15 also includes the subject matter according to any one of examples 13 or 14, above.

The apparatus further includes an anchor. The frame includes a base and a hood. The membrane extends out of the frame between the base and the hood. The membrane is attached to the anchor. The preceding subject matter of this paragraph characterizes example 16 of the present disclosure, wherein example 16 also includes the subject matter according to any one of examples 13-15, above.

The membrane is an elastomeric membrane. The preceding subject matter of this paragraph characterizes example 17 of the present disclosure, wherein example 17 also includes the subject matter according to any one of examples 13-16, above.

Disclosed herein is a method of hot drape forming a part according to one or more examples of the present disclosure. The method includes stretching a membrane across an enclosed interior space at a first distance away from a support surface partially defining the enclosed interior space and while stretched across the enclosed interior space, moving the membrane to a second distance away from the support surface, the second distance being different than the first distance. The method further includes positioning a forming tool within the enclosed interior space between the membrane and the support surface. The method further includes positioning a laminate material between the forming tool and the membrane such that the membrane is contacting at least a portion of the laminate material. The method further includes heating the laminate material. The method further includes forming a vacuum within the interior space between the membrane and the support surface. The preceding subject matter of this paragraph characterizes example 18 of the present disclosure.

Moving the membrane to the second distance includes moving an adjustable collar co-movably coupled to the membrane. The preceding subject matter of this paragraph characterizes example 19 of the present disclosure, wherein example 19 also includes the subject matter according to example 18, above.

The method includes moving an anchor external to the interior space. The membrane is attached to the anchor. The preceding subject matter of this paragraph characterizes example 20 of the present disclosure, wherein example 20 also includes the subject matter according to any one of examples 19 or 20, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
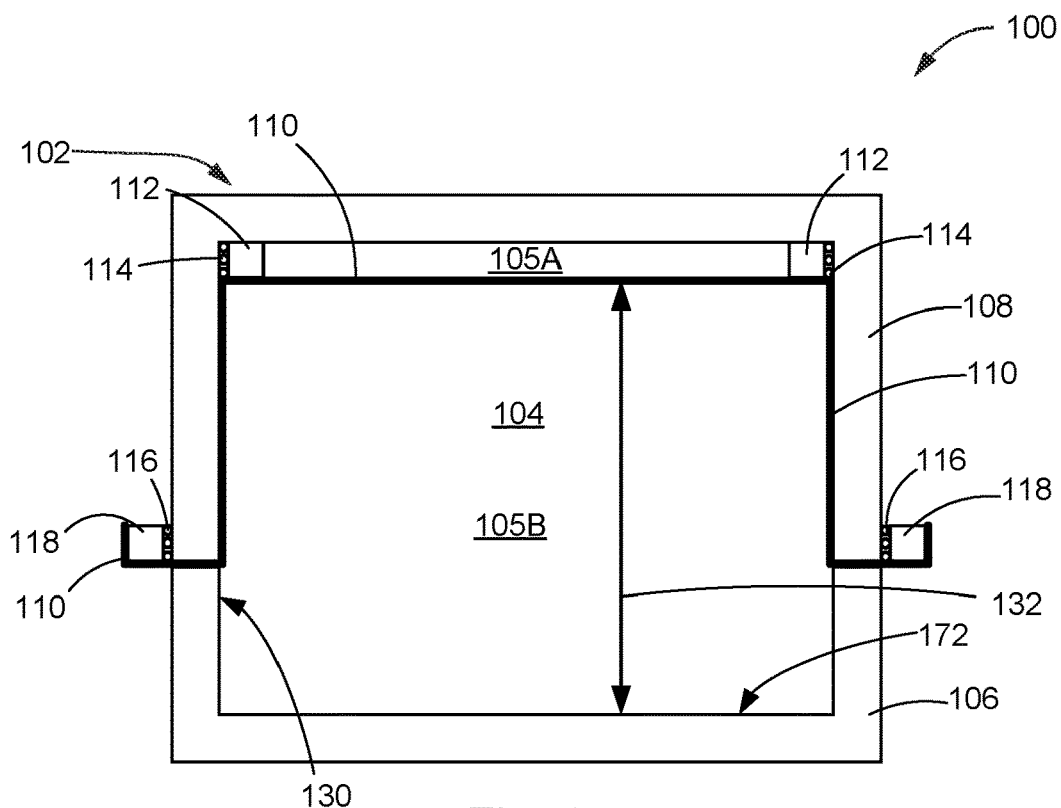
FIG. 1 is a cross-sectional side view of an apparatus for hot drape forming a part, according to one or more embodiments of the present disclosure.

Referring to FIG. 1, one embodiment of an apparatus 100 for hot drape forming a part is shown. The apparatus 100 is used during hot drape forming processes. As will be described in more detail below, the apparatus 100 includes an adjustable height membrane, which promotes use of variously sized forming tools for forming parts of different shapes, sizes, and heights.

The apparatus 100 includes a frame 102. The frame 102 forms an enclosable interior space 104. The interior space 104 is large enough and shaped to allow a forming tool 120 (see, e.g., FIGS. 5-10) and a laminate material 128 (see, e.g., FIGS. 5-10) to be enclosed therein. The frame 102 includes a base 106 and a hood 108. The base 106 is a lower support structure that supports the forming tool 120 within the interior space 104. The hood 108 rests on the base 106 and, along with a membrane 110, forms a seal between the base 106 and the hood 108. The hood 108 may be indirectly coupled to the base 106 via only the membrane 110. However, in other implementations, the hood 108 is directly coupled to the base 106, such as via pivotal attachment or other attachment. The attachment between the hood 108 and the base 106 allows the hood 108 to open and close relative to the base 106 while remaining attached to the base 106.

The base 106 and the hood 108 form an enclosure with a top, bottom, and sides (e.g., four sides). More specifically, the base 106 forms a support surface 172 of the interior space 104 upon which the forming tool 120 may rest. The hood 108 forms a top surface of the interior space 104. The base 106 and the hood 108 together form side surfaces of the interior space or sidewalls 130 of the frame 102. In other words, the frame 102 includes sidewalls 130 cooperatively formed by the base 106 and the hood 108. In one example, the sidewalls 130 are perpendicular to the top surface and the support surface 172 of the interior space 104. According to one implementation, the base 106 and the hood 108 form four sidewalls 130 of the frame 102. However, in other implementations, the base 106 and the hood 108 form any number of sidewalls 130 to form a perimeter of the interior space 104 of the frame 102. Although shown as a rectangular box or prism, the frame 102 may take the form of other shapes, regular or irregular, that enclose various size forming tools, such as cylinder, triangular prism, octagonal prism, etc.

Figure 7:
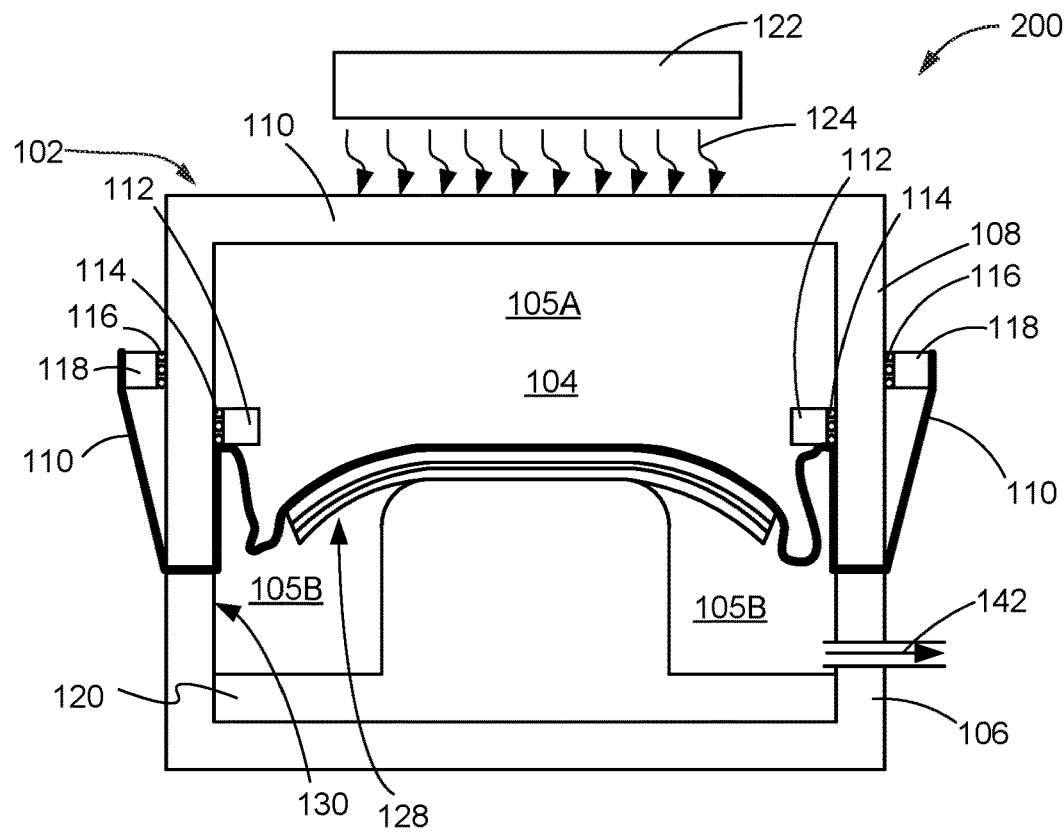
FIG. 7 is a cross-sectional side view of a system for hot drape forming a part depicted during evacuation of air from the interior space, according to one or more embodiments of the present disclosure.
Figure 8:
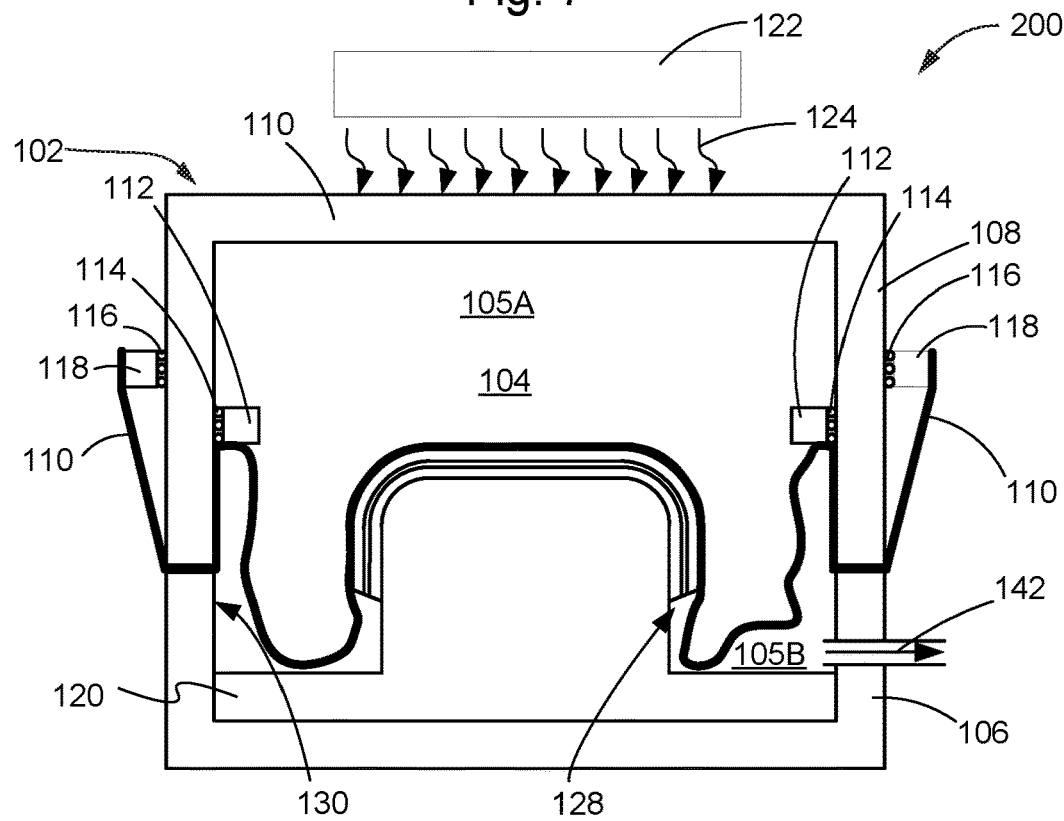
FIG. 8 is a cross-sectional side view of a system for hot drape forming a part with the part formed over the forming tool, according to one or more embodiments of the present disclosure.

The frame 102 is made of a heat conducting material to allow the interior space 104 and, more particularly, the laminate material 128, when positioned within the interior space 104, to reach a critical forming temperature prior to forming the laminate material 128 over the forming tool 120 (see, e.g., FIGS. 7-8). During a hot drape forming process, the frame 102 is configured to maintain a pressure in the interior space 104 above the membrane 110 as the pressure below the membrane 110 is reduced in response to air being evacuated from the interior space 104 below the membrane 110. The hood 108 and the membrane 110 form a first chamber 105A within the interior space 104. The base 106 and the membrane 110 form a second chamber 105B within the interior space 104.

The apparatus 100 further includes an adjustable collar 112 within the interior space 104 of the frame 102. The adjustable collar 112 is attached to the sidewalls 130 of the frame 102. Moreover, the adjustable collar 112 is configured to move (e.g., vertically) within the frame 102 along the sidewalls 130.

Figure 2:
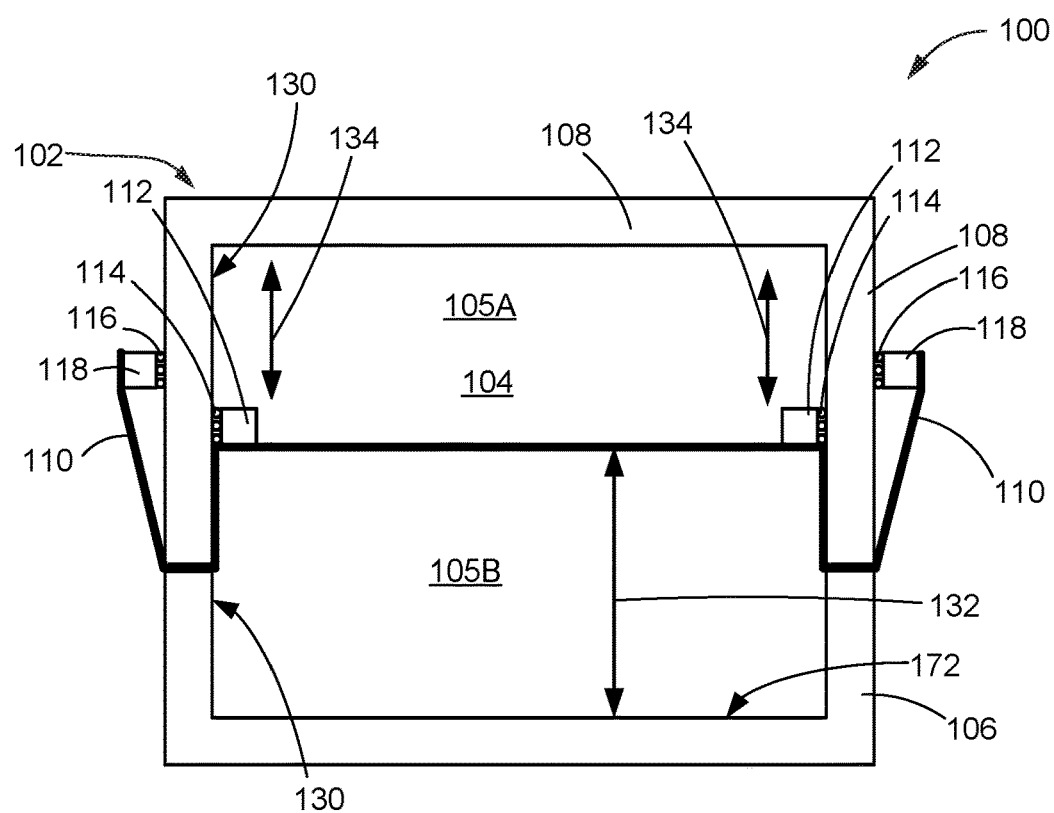
FIG. 2 is a cross-sectional side view of an apparatus for hot drape forming a part, according to one or more embodiments of the present disclosure.

In contrast to FIG. 1, which depicts the adjustable collar 112 in a first position along the sidewalls 130, FIG. 2 depicts the adjustable collar 112 at a second position along the sidewalls 130. The arrows 134 in FIG. 2 illustrate the direction of motion of the adjustable collar 112 along the sidewalls 130. The adjustable collar 112 extends about and in close proximity to a perimeter of the interior space 104, which is formed by the sidewalls 130. Generally, the adjustable collar 112 forms the same shape as the cross-sectional shape of the interior space 104. For example, referring to FIG. 3, the sidewalls 130 form a rectangular cross-sectional shape of the perimeter of the interior space 104. Accordingly, the adjustable collar 112 has a rectangular shape that effectively matches the shape of the cross-section of the perimeter. The adjustable collar 112 is attached to the sidewalls 130 by rollers 114, or other engagement elements that facilitate movement between the collar 112 and the sidewalls 130. The rollers 114 allow the adjustable collar 112 to move vertically along the sidewalls 130 to any of various vertical positions desirable to a user and depending on the size/shape of the forming tool 120.

Figure 4:
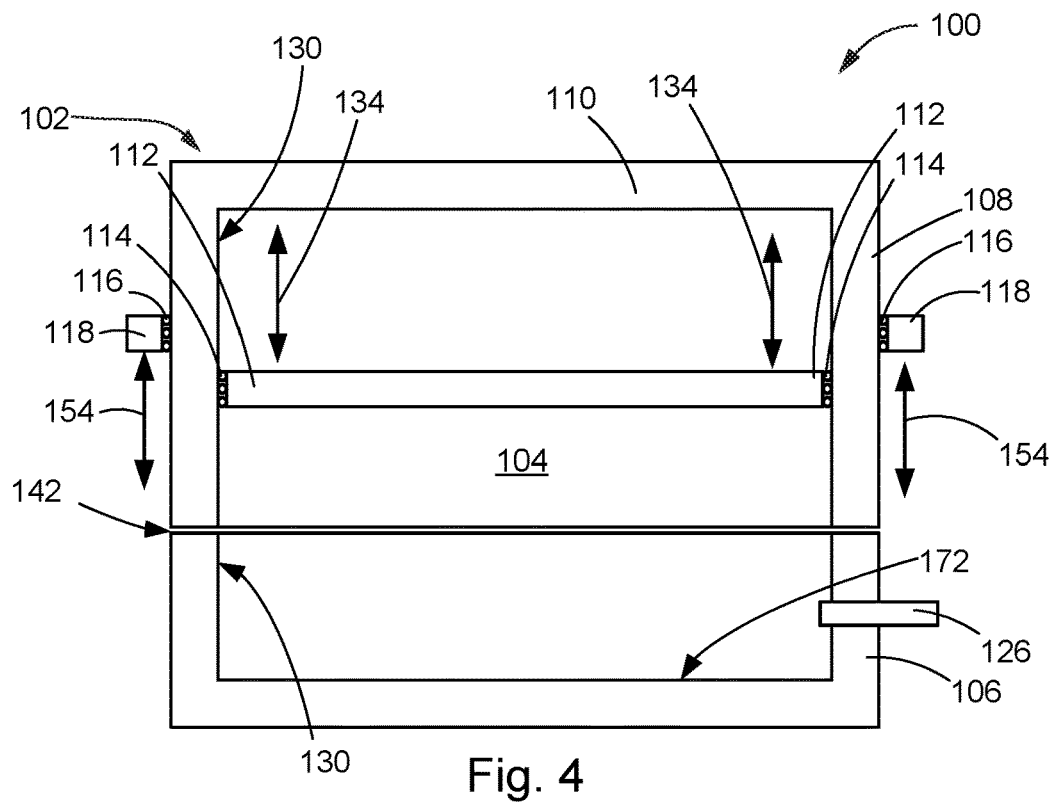
FIG. 4 is a cross-sectional side view of an apparatus for hot drape forming a part with the membrane removed, according to one or more embodiments of the present disclosure.

Although depicted as attached to the sidewalls 130, the adjustable collar 112, in other embodiments, may be attached to the top surface of the interior space 104 and actuate up and down along the sidewalls 130. Although depicted as a rod that extends about the perimeter of the interior space along the sidewalls 130, the adjustable collar 112 may, in some embodiments, be a sheet or panel that spans completely across the interior space 104 as depicted in FIG. 4. The vertical position of the adjustable collar 112 may be adjusted in any of a number ways including, but not limited to, manually, electronically, mechanically, pneumatically, etc. In one example, the adjustable collar 112 may be coupled to a computer or other electronic device capable of controlling the movement and position of the adjustable collar 112. The computer or other electronic device may base the positioning of the adjustable collar 112 on the size and shape of the forming tool 120 used and/or the thickness or material specifications of the laminate material 128.

The membrane 110 spans across the interior space 104 to each of the sidewalls 130 in a direction perpendicular to the direction of motion of the adjustable collar 112. The membrane 110 runs along the sidewalls 130 from the adjustable collar 112 to an opening 142 (see, e.g., FIG. 4) or gap between the base 106 and the hood 108. The membrane 110 extends out from the interior space 104 of the frame 102 through the gap or opening 142 and is attached to an anchor 118 external to the frame 102.

The membrane 110 is co-movably coupled with the adjustable collar 112. That is, as the adjustable collar 112 moves translationally within the interior space along the sidewalls 130, the portion of the membrane 110 that spans across the interior space 104 moves as well. In some implementations, the membrane 110 is non-releasably attached to the adjustable collar 112. Referring to FIGS. 1 and 2, the membrane 110 is non-releasably attached to the adjustable collar 112 at a bottom surface of the adjustable collar 112. The membrane 110 may be attached to the adjustable collar 112 at any of a number of points on the adjustable collar 112 including the top or sides of the adjustable collar. In some implementations, the membrane 110 is attached to the adjustable collar 112 continuously around the perimeter of the interior space 104. In some implementations, the membrane 110 is attached to the adjustable collar 112 only at certain points (for example, periodically) around the perimeter of the interior space.

In implementations where the membrane 110 is attached to the adjustable collar 112, the membrane 110 stays equally tensioned across the interior space 104 regardless of the vertical position of the adjustable collar 112. In other words, the tension in the portion of the membrane 110 that spans across the interior space 104 is constant at any of various positions of the adjustable collar 112. The height at which the membrane 110 extends across the interior space 104 is a standoff height depicted by arrows 132. The standoff height of the membrane 110 can be adjusted to fit various size forming tools 120 allowing the apparatus 100 to be used with a plurality of forming tools 120 and to be used to form a variety of finished parts. The standoff height is measured from the support surface 172 of the interior space 104 to the height at which the membrane 110 spans across the interior space 104. An initial standoff height is the standoff height when the hot drape forming process begins by heating the interior space 104.

Figure 9:
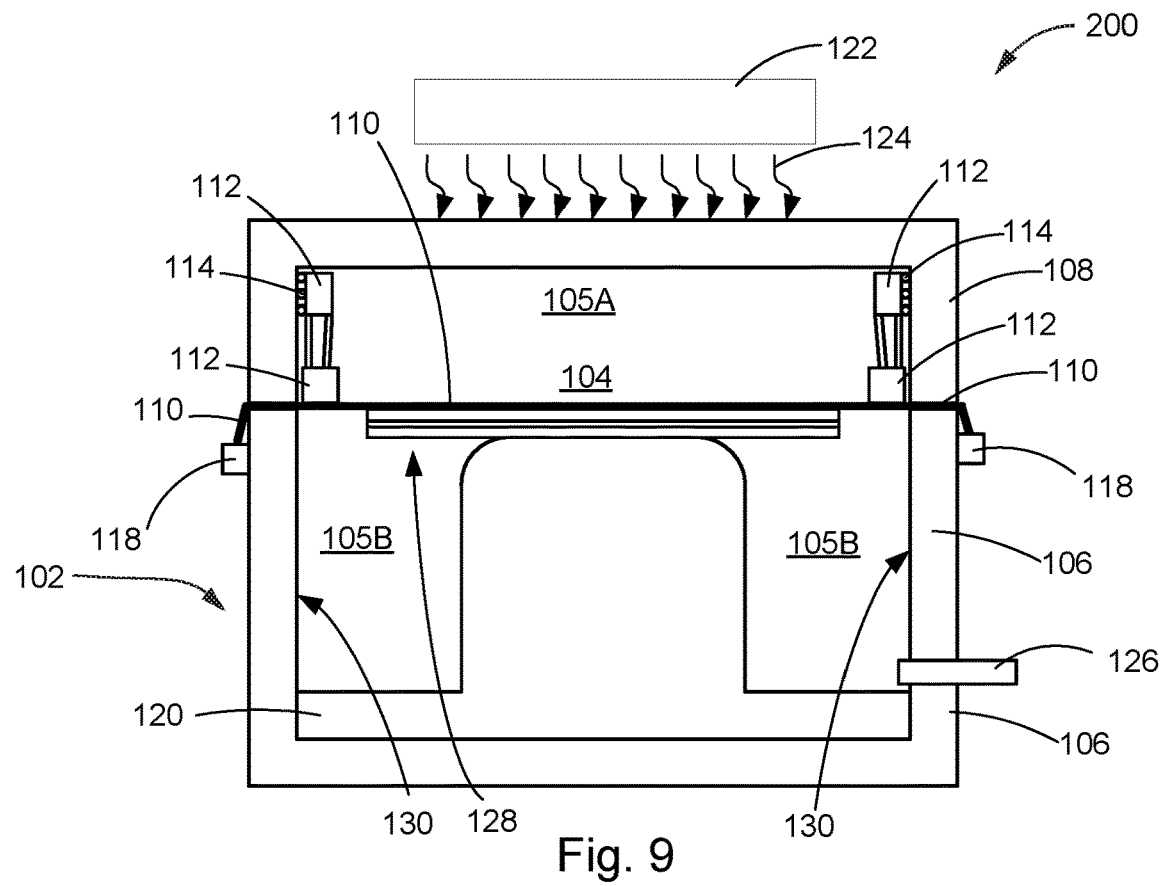
FIG. 9 is a cross-sectional side view of a system for hot drape forming a part, according to one or more embodiments of the present disclosure.
Figure 10:
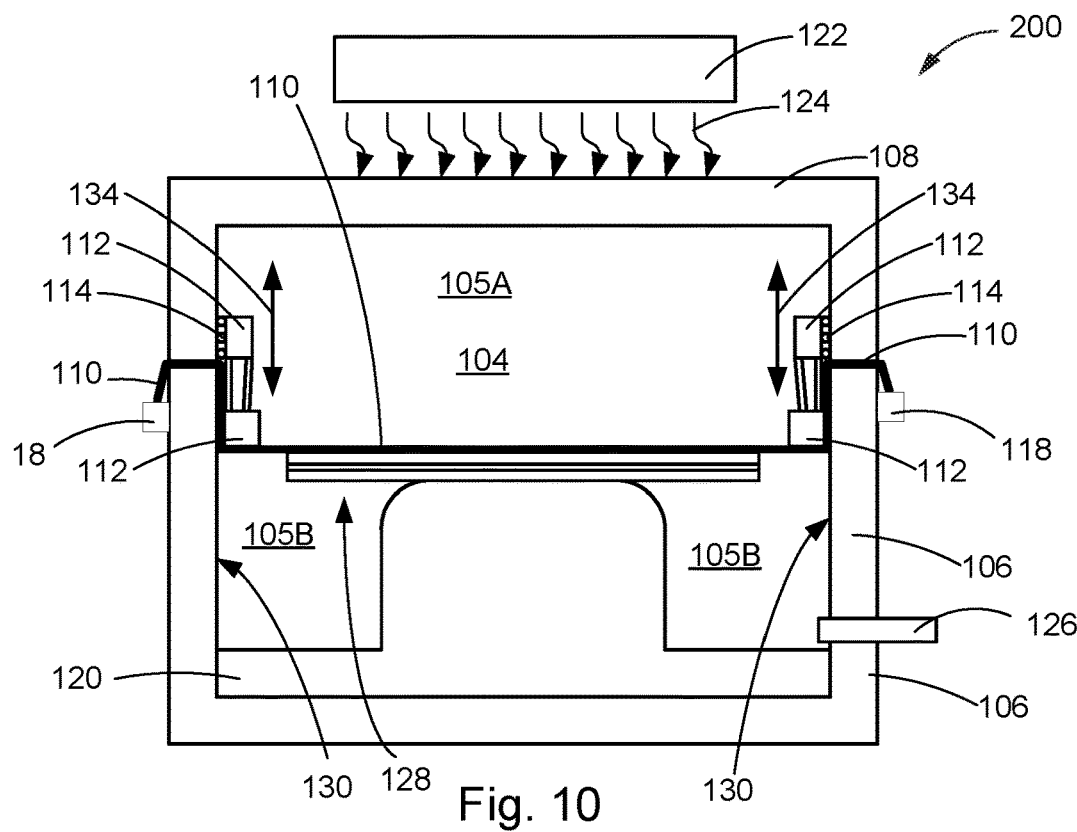
FIG. 10 is a cross-sectional side view of a system for hot drape forming a part, according to one or more embodiments of the present disclosure.

In some embodiments, the membrane 110 is releasably attached to the adjustable collar 112 (see, e.g., FIGS. 9 and 10). In some implementations, the membrane 110 does not stay equally tensioned across the interior space 104 regardless of the vertical position of the adjustable collar 112. In other words, the tension in the portion of the membrane 110 that spans across the interior space 104 changes at any of various positions of the adjustable collar 112. Referring to FIG. 10, the adjustable collar 112 is in a lower position than the adjustable collar 112 depicted in FIG. 9. As the adjustable collar 112 positioned down, the membrane 110 stretches around the adjustable collar 112 and up the sidewalls and out the gap between the base 106 and the hood 108. As the adjustable collar 112 moves down along the sidewalls 130, the portion of the membrane 110 that spans across the interior space 104 will further stretch and the tension in the membrane will increase. As the adjustable collar 112 moves up along the sidewalls 130, the portion of the membrane 110 that spans across the interior space 104 will be stretched less and the tension in the membrane will decrease.

The membrane 110 is a flexible material capable of conforming around the laminate material 128 and forming tool 120 when the interior space 104 is pressurized. In some embodiments, the membrane 110 is an elastomeric membrane.

The anchor 118 is external to the frame 102. The membrane 110 is fixedly attached to the anchor 118. In some implementations, the anchor 118 is attached to an exterior surface of the frame 102 (see, e.g., FIGS. 1 and 2). As the adjustable collar 112 moves down the sidewalls 130 and the standoff height of the membrane 110 decreases, the portion of the membrane 110 that runs along the sidewalls between the adjustable collar 112 and the opening 142 will have more slack. The slack may be taken up by adjusting the position of the anchor 118. As depicted between FIGS. 1 and 2, the adjustable collar 112 is moved down to adjust the standoff height of the membrane 110. The anchor 118 external to the frame 102 is moved up the exterior surface of the frame 102 to take up any slack within the interior space 104. In some implementations, the anchor 118 is attached to the frame 102 by rollers 116. The rollers 116 allow the anchor 118 to move (e.g., vertically) along the exterior of the frame 102 to a vertical position desirable to the user. In some embodiments, the adjustable collar 112 and the anchor 118 move synchronously. For example, as the adjustable collar 112 moves down within the frame 102, the anchor 118 moves up at a same or similar rate.

The movement and the positioning of the anchor 118 may be adjusted in any of a number ways including, but not limited to, manually, electronically, mechanically, pneumatically, etc. In one example, the anchor 118 may be coupled to a computer or other electronic device capable of controlling the movement and position of the anchor 118. The computer or other electronic device may base the positioning of the anchor 118 on the positioning of the adjustable collar 112 and may move the anchor 118 and the adjustable collar 112 together.

Figure 3:
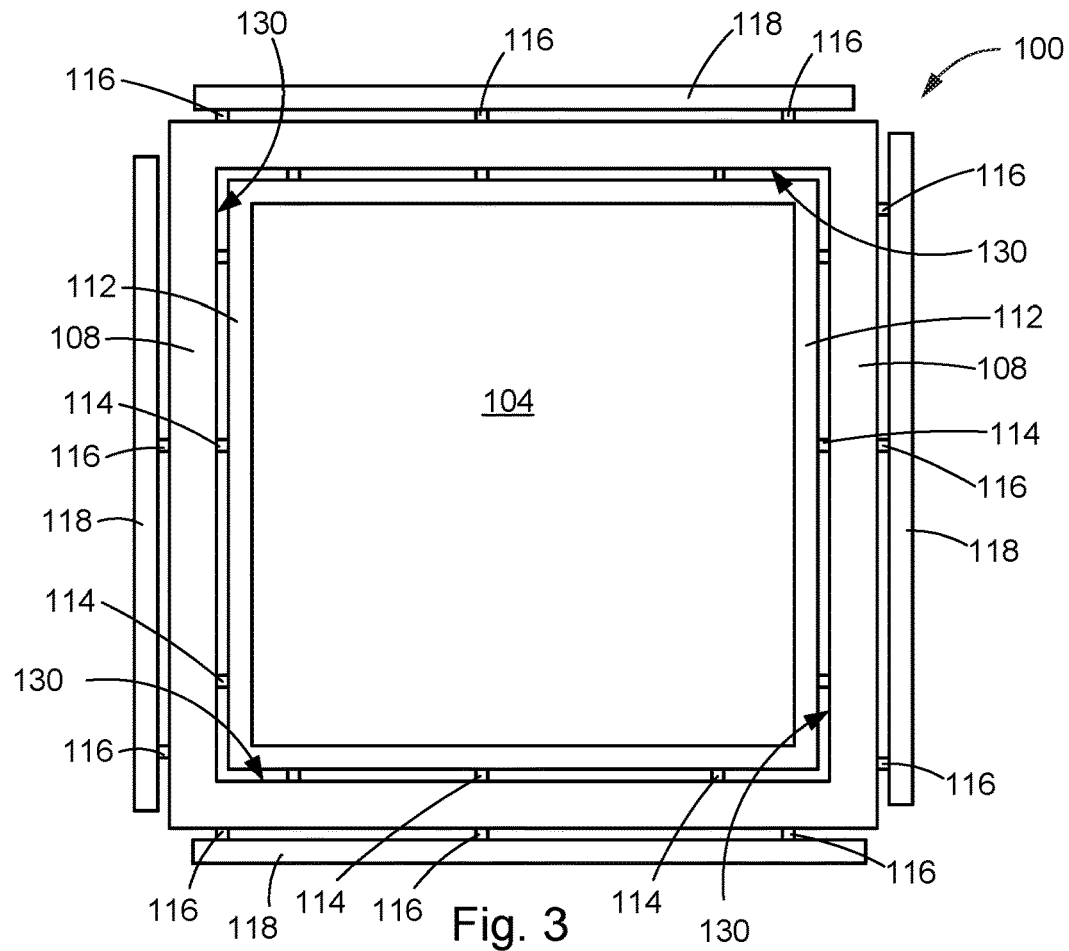
FIG. 3 is a cross-sectional top view of an apparatus for hot drape forming a part with the membrane removed, according to one or more embodiments of the present disclosure.

While the anchor 118 is depicted as moving up and down the frame 102 at a position above the opening 142, the anchor 118 could alternatively move up and down the frame 102 at a position below the opening 142. In some embodiments, the anchor 118 may not be attached to the frame 102 but may move outwards in a direction away from the opening 142. In some embodiments, the anchor 118 may not move relative to the frame 102 but may be tubes that roll up excess slack outside the frame 102. Referring to FIG. 3, the anchor 118 includes four separate pieces located around the exterior perimeter of the frame 102. In some embodiments, the anchor 118 may provide more or less anchor points to attach the membrane 110 to the anchor 118. In some embodiments, the anchor 118 may extend all the way around the exterior perimeter of the frame 102.

Figure 5:
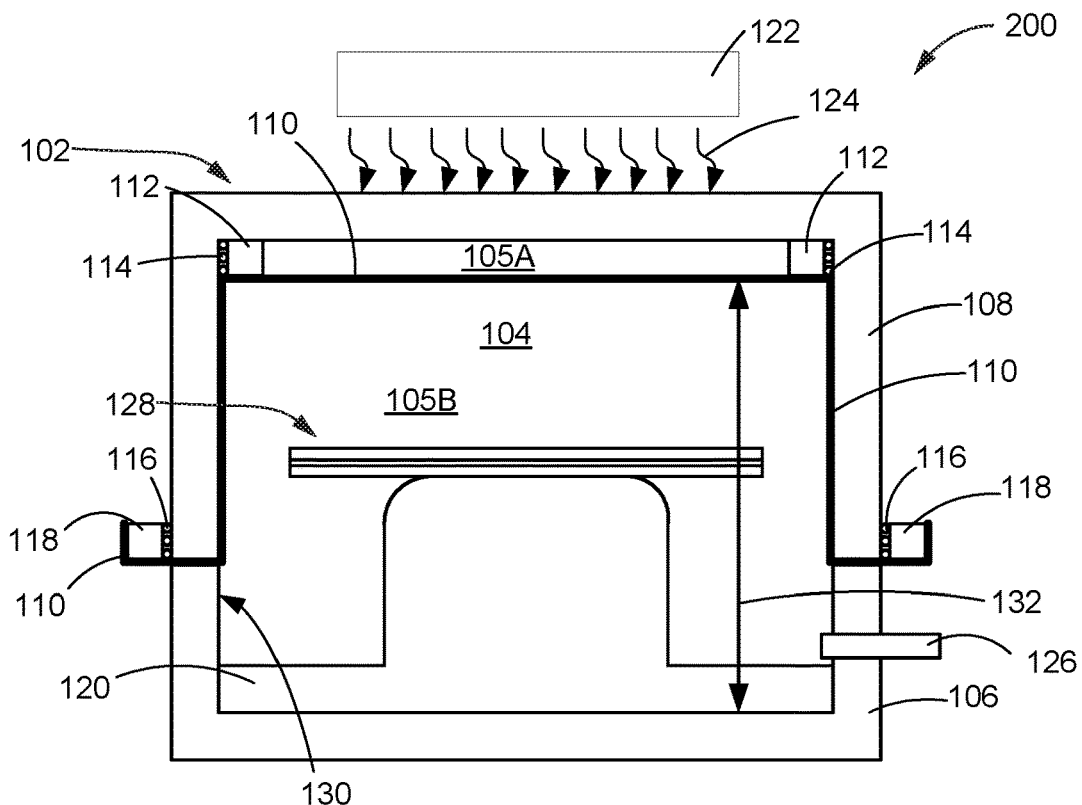
FIG. 5 is a cross-sectional side view of a system for hot drape forming a part including a forming tool and a laminate material, according to one or more embodiments of the present disclosure.

Referring to FIGS. 5-8, a system 200 for adjusting a membrane height for a hot drape forming process is shown with the forming tool 120 and the laminate material 128 within the apparatus 100. The system 200 includes a heat source 122 and a vacuum source 126. Referring to FIG. 5, the apparatus 100 is depicted with the adjustable collar 112 at an uppermost position within the frame 102 with the standoff height depicted by arrows 132. Forming tools 120 of various sizes and heights may be utilized within the apparatus 100. A membrane with an adjustable standoff height allows for the flexibility to use a single apparatus 100 for multiple forming tools and part configurations. With the forming tool 120 and the laminate material 128 enclosed within the frame 102, the adjustable collar 112 may move down to a position directly above the laminate material 128. The forming tool 120 is a male tool with a curved or contoured surface onto which a laminate material 128 is formed into a desired shape during a hot drape forming process. With the membrane 110 in position, the apparatus 100 is heated by a heat source 122 and the laminate material 128 is heated to a critical forming temperature. The transfer of heat is depicted by arrows 124.

Figure 6:
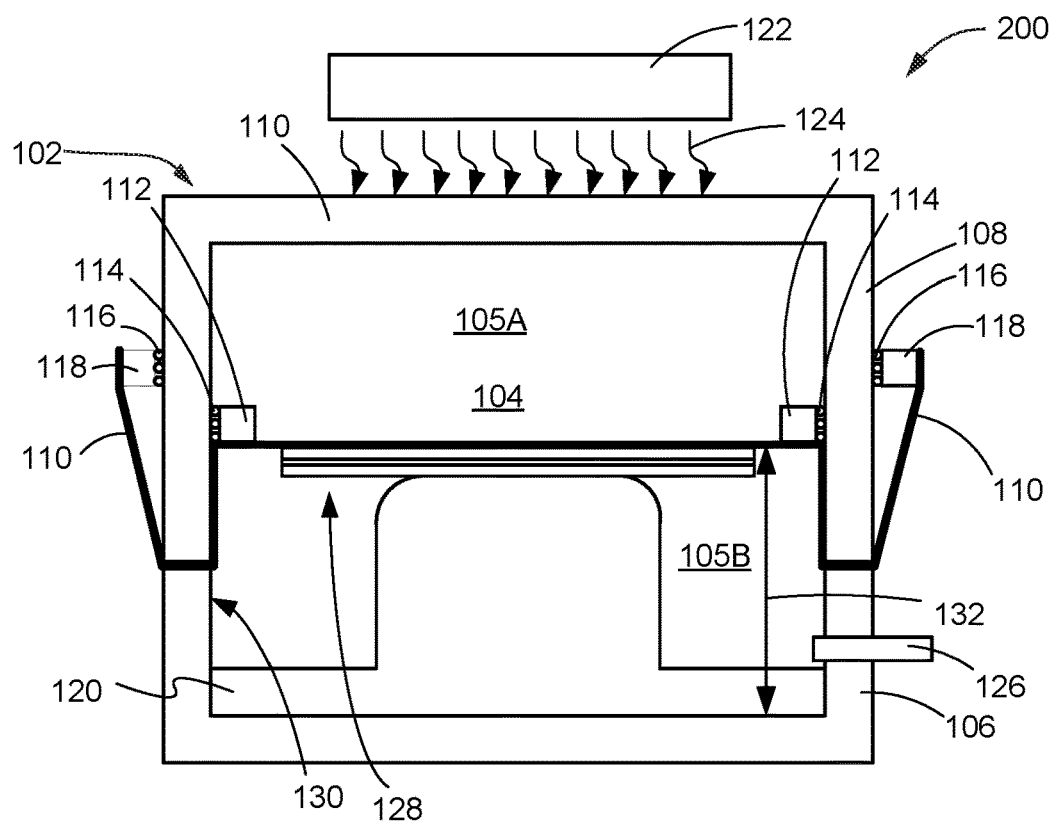
FIG. 6 is a cross-sectional side view of a system for hot drape forming a part with the membrane moved in a first direction, according to one or more embodiments of the present disclosure.

The membrane 110, as depicted in FIG. 6, is directly above the laminate material 128 but is not draped over the laminate material 128 and weighing the down the laminate material 128. In some implementations, the membrane 110 is touching the laminate material 128 so as to optimize heat transfer to the laminate material 128 but does not prematurely bend the laminate material 128 prior to laminate material reaching the critical forming temperature. After reaching the forming temperature, a vacuum source 126 evacuates air (depicted by arrow 142 in FIG. 7) from the second chamber 105B, which pressurizes the first chamber 105A. As the air is evacuated from the second chamber 105B, the membrane 110 applies pressure to the laminate material 128 causing the overhanging edges, sometimes referred to as flanges, of the laminate material 128 to bend and form to the shape of the forming tool 120 until the laminate material 128 substantially assumes the contour of the forming tool 120. A hot drape forming process allows for the manufacture of laminate materials such as composite materials in more complicated curved shapes. Referring to FIG. 7, the system 200 is shown in the middle of the process as the laminate material 128 is beginning to conform to the shape of the forming tool 120. Referring to FIG. 8, the system 200 is shown with the laminate material 128 fully formed over the forming tool 120.

Referring to FIGS. 9 and 10, another embodiment of an apparatus 100 and system 200 for adjusting a membrane height for a hot drape forming process is shown. The features described in conjunction with FIGS. 1 through 8 may also be present within the embodiments described in conjunction with FIGS. 9 and 10. FIGS. 9 and 10 depict an apparatus 100 utilized with two forming tools 120 with different heights. In each example the initial standoff height of the membrane 110 may be adjusted to conform to the size forming tool 120 utilized. The adjustable collar 112 moves up and down the sidewalls 130 of the frame 102 and push the membrane 110 in place to an initial standoff height directly above the laminate material 128. The membrane 110 is releasably attached or coupled to the adjustable collar 112. As the adjustable collar 112 moves down along the sidewalls 130, the membrane 110 is stretched over the adjustable collar 112 (see, e.g., FIG. 10). The membrane 110 extends out of the frame 102 at an opening between the base 106 and the hood 108 and is attached to an anchor 118 external to the frame 102. The anchor 118 is fixed and does not move relative to the frame. The anchor 118 may be attached to the frame 102 or secured at a fixed position outside the frame 102. As the adjustable collar 112 moves vertically within the frame the membrane 110 stretches around the adjustable collar 112. Thus, the membrane 110 is not equally tensioned regardless of the vertical position of the adjustable collar 112. As the adjustable collar 112 moves further down the sidewalls 130, the membrane 110 is further stretched as it spans horizontally across the interior space 104.

Figure 11:
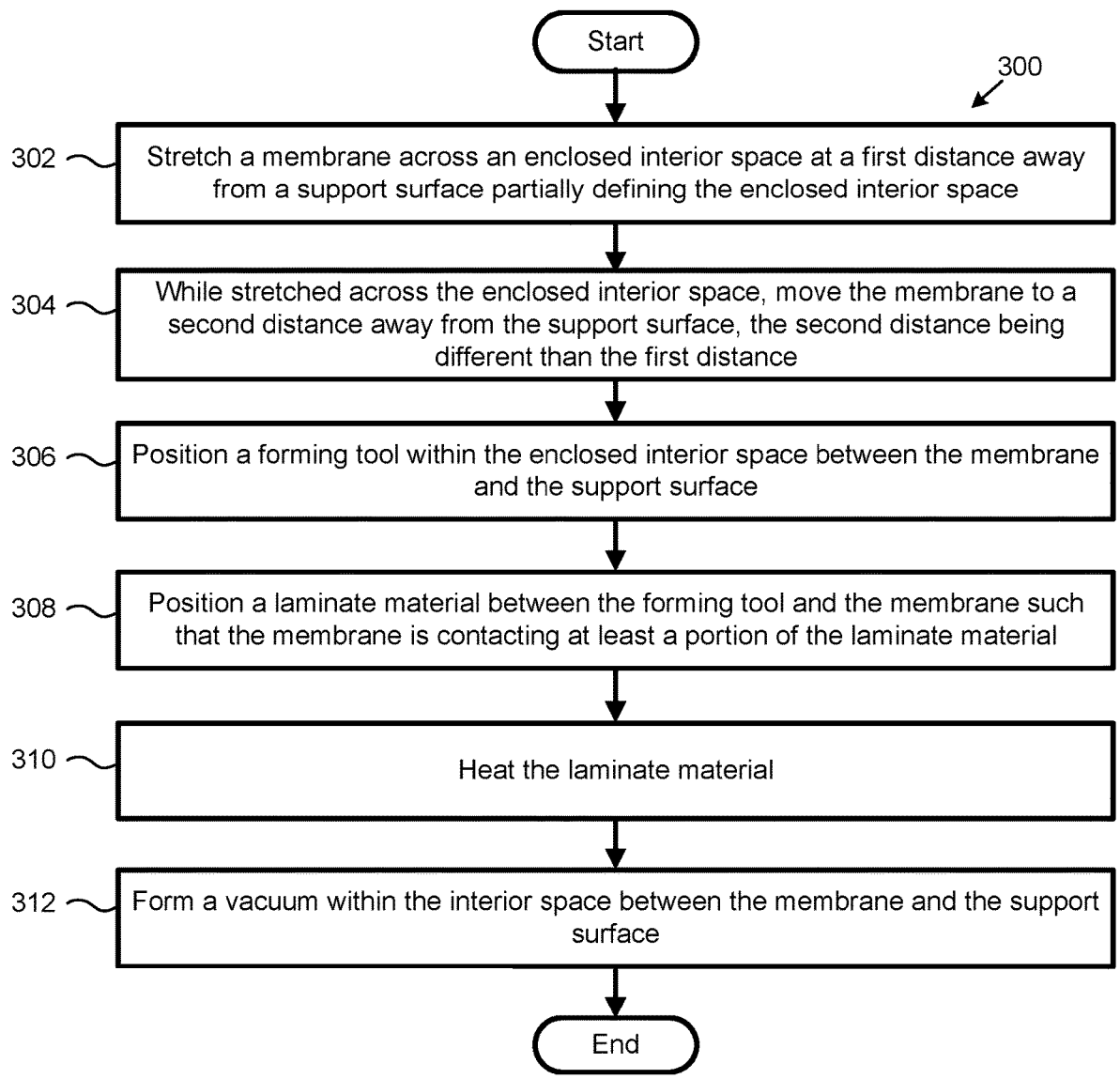
FIG. 11 is a schematic flow diagram of a method of hot drape forming a part, according to one or more embodiments of the present disclosure.

Now referring to FIG. 11, one embodiment of a method 300 of hot drape forming a part is shown. The method 300 includes stretching a membrane across an enclosed interior space at a first distance away from a support surface partially defining the enclosed interior space at 302 and while stretched across the enclosed interior space, moving the membrane to a second distance away from the support surface at 304. The second distance being different than the first distance. At 306, the method 300 includes positioning a forming tool within the enclosed interior space between the membrane and the support surface. The method 300 additionally includes positioning a laminate material between the forming tool and the membrane such that the membrane is contacting at least a portion of the laminate material at 308. In some implementations, the method 300 includes heating the laminate material at 310 and forming a vacuum within the interior space between the membrane and the support surface at 312. The method then ends.

In some implementations, moving the membrane to the second distance includes moving an adjustable collar co-movably coupled to the membrane. In some implementations, method further includes moving an anchor external to the interior space, wherein the membrane is attached to the anchor. Although described in a depicted order, the method of hot drape forming a part may proceed in any of a number of ordered combinations. As example, the forming tool and the laminate material may be positioned prior to stretching the membrane and moving the membrane to a second distance away from the support surface.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification.

For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagram included herein is generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. An apparatus for hot drape forming a part, comprising:
a frame comprising a base, a hood, and an interior space, wherein the base and the hood are coupleable to enclose the interior space, and wherein the base defines a bottom of the frame and the hood defines a top of the frame;
an adjustable collar within the interior space of the frame, wherein the adjustable collar extends about a perimeter of the interior space and is configured to move translationally within the interior space of the frame along the sidewalls in a first direction, wherein the adjustable collar is positioned to remain above the part to be hot drape formed when the interior space is enclosed and as the part is hot drape formed;
a membrane extending across the interior space in a second direction, perpendicular to the first direction, and co-movably coupled with the adjustable collar, wherein, when the interior space is enclosed, a position of the membrane within the interior space is adjustable in the first direction as the adjustable collar moves translationally within the interior space, and wherein, when the interior space is enclosed, the membrane within the interior space is distanced away from the top of the frame; and
an anchor external to the frame, wherein the membrane is attached to the anchor.

2. The apparatus according to claim 1, wherein the membrane is non-releasably attached to the adjustable collar.

3. The apparatus according to claim 2, wherein a tension in the membrane is constant at any of various positions in the first direction.

4. The apparatus according to claim 1, wherein the membrane extends out of the frame between the base and the hood.

5. The apparatus according to claim 1, wherein the anchor external to the frame is movably fixed to the frame.

6. The apparatus according to claim 5, wherein the adjustable collar and the anchor are configured to move synchronously.

7. The apparatus according to claim 1, wherein the membrane is releasably attached to the adjustable collar.

8. The apparatus according to claim 7, wherein the membrane stretches around the adjustable collar.

9. The apparatus according to claim 1, wherein the membrane is an elastomeric membrane.

10. The apparatus according to claim 1, wherein a position of the adjustable collar along the first direction is controlled electronically.

11. The apparatus according to claim 1, wherein:
the membrane divides the interior space, when the interior space is enclosed, into a first chamber above the membrane and a second chamber below the membrane;
the membrane seals the first chamber from the second chamber; and
the apparatus further comprises a vacuum device fluidically coupled with the second chamber and operable to evacuate air from the second chamber.

12. The apparatus according to claim 6, wherein the adjustable collar and the anchor are configured to move synchronously in opposite directions.

13. A system for hot drape forming a part, comprising:
a forming tool;
a laminate material;
a heat source; and
an apparatus comprising:
a frame comprising a base, a hood, and an interior space, wherein the base and the hood are coupleable to enclose the interior space, and wherein the base defines a bottom of the frame and the hood defines a top of the frame, and wherein the forming tool and the laminate material are positioned within the interior space;
an adjustable collar within the interior space of the frame, wherein the adjustable collar extends about a perimeter of the interior space and is configured to move translationally within the interior space of the frame along the sidewalls in a first direction, wherein the adjustable collar is positioned to remain above the part to be hot drape formed when the interior space is enclosed and as the part is hot drape formed; and
a membrane extending across the interior space in a second direction, perpendicular to the first direction, and co-movably coupled with the adjustable collar, wherein, when the interior space is enclosed, a position of the membrane within the interior space is adjustable in the first direction as the adjustable collar moves translationally within the interior space, and wherein, when the interior space is enclosed, the membrane within the interior space is distanced away from the top of the frame; and
an anchor, wherein the membrane extends out of the frame between the base and the hood, and wherein the membrane is attached to the anchor.

14. The system according to claim 13, wherein the membrane extends across the interior space in the second direction at a position directly above the laminate material.

15. The system according to claim 13, wherein the forming tool comprises a predetermined height.

16. The system according to claim 13, wherein the membrane is an elastomeric membrane.

17. The system according to claim 13, wherein the top of the frame is distanced from the laminate material such that the top of the frame does not apply mechanical pressure to the laminate material when the interior space is enclosed.

18. The system according to claim 13, wherein:
- the membrane divides the interior space, when the interior space is enclosed, into a first chamber above the membrane and a second chamber below the membrane;
- the membrane seals the first chamber from the second chamber;
- the forming tool and the laminate material are located within the second chamber; and
- the apparatus further comprises a vacuum device fluidically coupled with the second chamber and operable to evacuate air from the second chamber.

19. The system according to claim 13, wherein the anchor is movably fixed to the frame.

20. The system according to claim 19, wherein the adjustable collar and the anchor are configured to move synchronously.

* * * * *